United States Patent Office 3,439,837
Patented Apr. 22, 1969

3,439,837
LEAK DETECTING SYSTEM AND METHOD
Robert T. Hearn and Robert M. Riordan, both c/o The Wayne Pump Company, Div. of Symington Wayne Corp., Salisbury, Md. 21801
Filed July 18, 1967, Ser. No. 654,242
Int. Cl. B67d 5/08; G01m 3/32
U.S. Cl. 222—52                                          10 Claims

ABSTRACT OF THE DISCLOSURE

A system and method for detecting leaks in a fluid supply line running from a pumping assembly to a fluid dispensing apparatus wherein a reference pressure is established corresponding to the fluid pressure in the supply line during a dispensing operation and the reference pressure is compared with the fluid pressure in the supply line for a predetermined time after the termination of the dispensing operation to ascertain the pressure differential therebetween. The existence of a leak in the fluid supply is indicated when the pressure differential is more than a predetermined amount.

BACKGROUND OF THE INVENTION

The present invention relates to a leak detecting system and method, and more particularly to a system and method for detecting leaks in a fluid supply line.

In the past, serious problems have been created by leaks in underground piping, especially small but significant leaks of combustible and explosive fluids which might go undetected for long periods of time. These problems are particularly critical in service stations since the leakage of gasoline creates a serious hazard to life and property. Financial loss due to the escaping fluid is also a major problem, and for this and other reasons, there has been a real need for simple, economical and dependable systems for detecting such leaks.

Accordingly, it is an object of the present invention to provide a simple, economical and highly reliable sytsem for detecting leaks in a fluid supply line.

Another object of the persent invention is to provide a simple and highly reliable method for detecting leaks in a fluid supply line.

SUMMARY OF THE INVENTION

In accordance with the present invention, a method is provided for detecting leaks in a fluid supply line running from a pumping assembly to a fluid dispensing apparatus. This method comprises the steps of establishing a reference pressure corresponding to the fluid pressure in the supply line during a dispensing operation and comparing the established reference pressure with the fluid pressure in the supply line for a predetermined time after the termination of the dispensing operation to ascertain the pressure differential therebetween. When the ascertained pressure differential is more than a predetermined amount a signal indicates that a leak exists in the fluid supply line.

The reference pressure may be established by trapping a portion of the fluid from the supply line at dispensing pressure upon termination of the dispensing operation. Moreover, the reference pressure can be established and immediately compared with the fluid pressure in the supply line simultaneously for a predetermined time after the termination of the dispensing operation. The indication that a leak exists in the fluid supply line may be accomplished by disabling the flow of fluid through the supply line during the next dispensing operation when the pressure differential is more than a predetermined amount.

The system for detecting leaks in the fluid supply line comprises a pressure differential detector constructed and arranged to indicate pressure differentials which exceed a predetermined amount. Upper and lower chambers are provided in the detector and conduits connect the chambers to the fluid supply line. A valve in the conduit network is provided for isolating the fluid pressure in the upper chamber from the fluid pressure in the remainder of the system for a predetermined time after termination of a dispensing operation and a valve operator is connected to open and close the valve. The valve operator closes the valve in the conduit arrangement for a predetermined time after the termination of the dispensing operation so that a leak in the fluid supply line causes the fluid pressure in that line and the fluid pressure in the lower chamber to decrease relative to the isolated fluid pressure in the upper chamber. Under these conditions the pressure differential detector indicates that a leak exists in the fluid supply line when the difference in fluid pressure between the upper and lower chambers is more than a predetermined amount.

The pressure differential detector may take the form of a housing having the above mentioned upper and lower chambers separated by a flexible diaphragm. The conduit network runs from the fluid supply line to the lower chamber of the detector, and from the lower chamber to the valve in that network. Additionally, the conduit extends from the valve to the upper chamber of the detector. The detector has an operator that moves between an extended leak indicating position and a depressed locked position. A biasing device urges the operator towards its extended leak indicating position, and a releasable locking arrangement holds the operator in its locked position under tight conditions. After the operator is locked in place and the reference pressure established by closing the valve in the conduit network, a leak in the fluid supply line causes the fluid pressure in that line and in the lower chamber to decrease relative to the isolated fluid pressure in the upper chamber. When the pressure differential exceeds the predetermined amount, the flexible diaphragm is urged in a downward direction far enough to trip the locking arrangement. This causes the operator to move upwardly under the influence of the biasing device to its extended leak indicating position.

A sealed air chamber can be connected to the conduit network between the valve and the upper chamber of the pressure differential detector with a flexible diaphragm separating the air in the chamber from the fluid in the conduit so that the fluid pressure in the upper chamber of the detector remains substantially constant after the valve operator closes the valve in the conduit.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which.

DETAILED DESCRIPTION OF THE INVENTION

Figure 1:
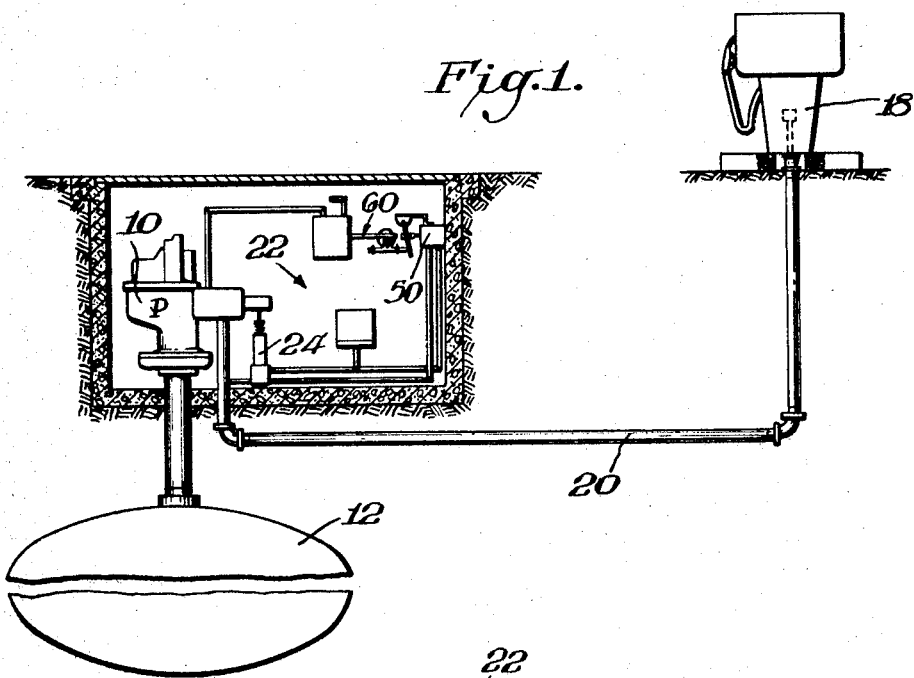
FIGURE 1 is a diagrammatic view of a leak detecting system according to the present invention.

Referring in more particularity to the drawing, a pumping assembly 10 is provided for removing the contents of an underground storage tank 12. The pumping assembly may be of the type disclosed in Gavin Patent 2,840,119 and includes a combination check and pressure relief valve 14 through which the fluid emerges as it leaves the pumping assembly. A pumping outlet 16 is connected to a fluid dispenser 18 by an underground fluid supply line 20 which serves to suply the dispenser or any number of dispensers connected to the line with fluid from the storage tank, such as gasoline.

In accordance with the present invention a system 22 is provided for detecting leaks in the fluid supply line 20. The system includes a pressure differential detector 24 which can be conveniently attached to the pump discharge head or any other suitable mounting location for the pumping assembly 10. A convenient form of pressure differential detector is somewhat similar to the pressure responsive device commonly utilized in gasoline dispensing nozzles to close a shut-off valve when the gasoline tank is filled to capacity. These detectors are responsive to the differential pressure developed when the gasoline level in the tank blocks an air inlet at the tip of the nozzle. Commonly assigned U.S. Patent 3,077,212, describes such an arrangement.

The pressure differential detector 24 has a housing 30 with an upper chamber 32 and a lower chamber 34 separated by a flexible diaphragm 36. As illustrated in the drawing, a port 38 is arranged to connect the upper chamber to the exterior of the housing and similar ports 40, 42 also function to connect the lower chamber to the housing exterior.

The leak detecting system 22 also includes a conduit network 44 having a first line 46 that runs from the fluid supply line 20 to the port 40 in the lower chamber of the detector. A second line 48 is provided for connecting the lower chamber to one side of a by-pass valve arrangement 50. As shown in the drawing, the second line extends from the second port 42 in the lower chamber of the detector and is suitably connected to the by-pass valve arrangement. Finally, the conduit network has a third line 52 running from the other side of the by-pass valve arrangement to the port 38 in the upper chamber of the detector.

Figure 2:
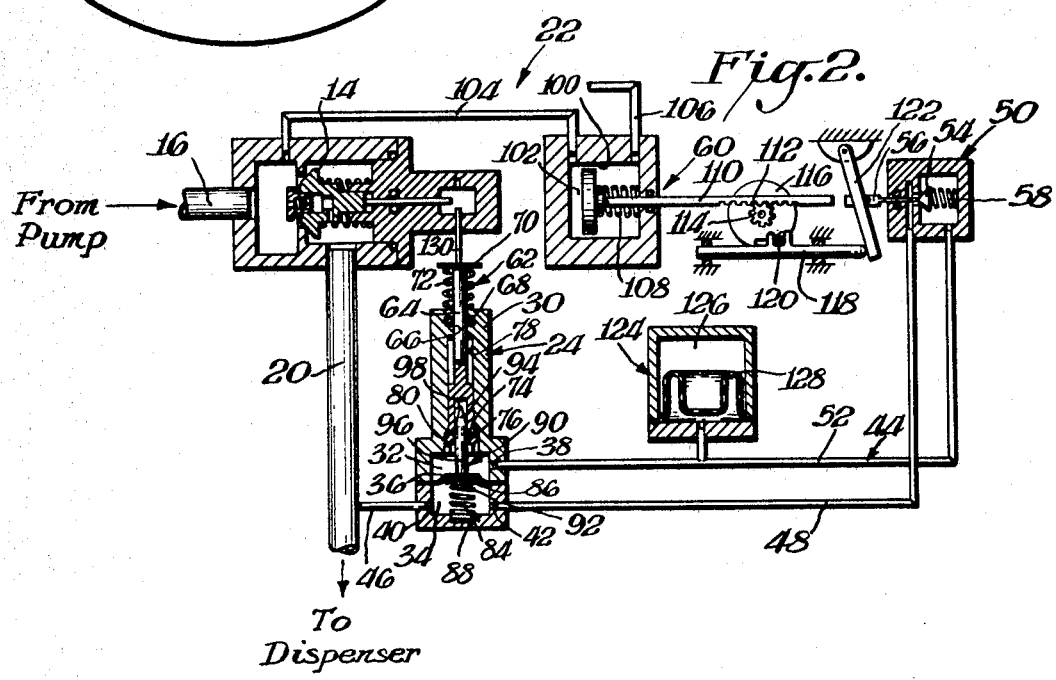
FIGURE 2 is an enlarged sectional view of the system illustrated in FIGURE 1 before a dispensing operation.
Figure 3:
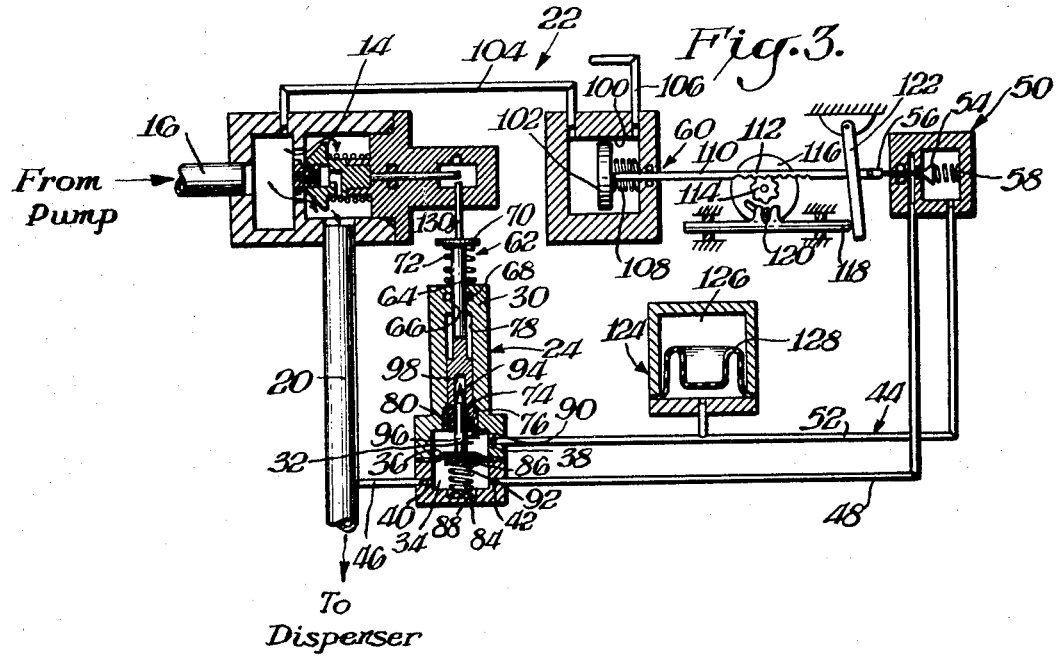
FIGURE 3 is a sectional view similar to FIGURE 2 showing the positions of the various components during a dispensing operation.
Figure 4:
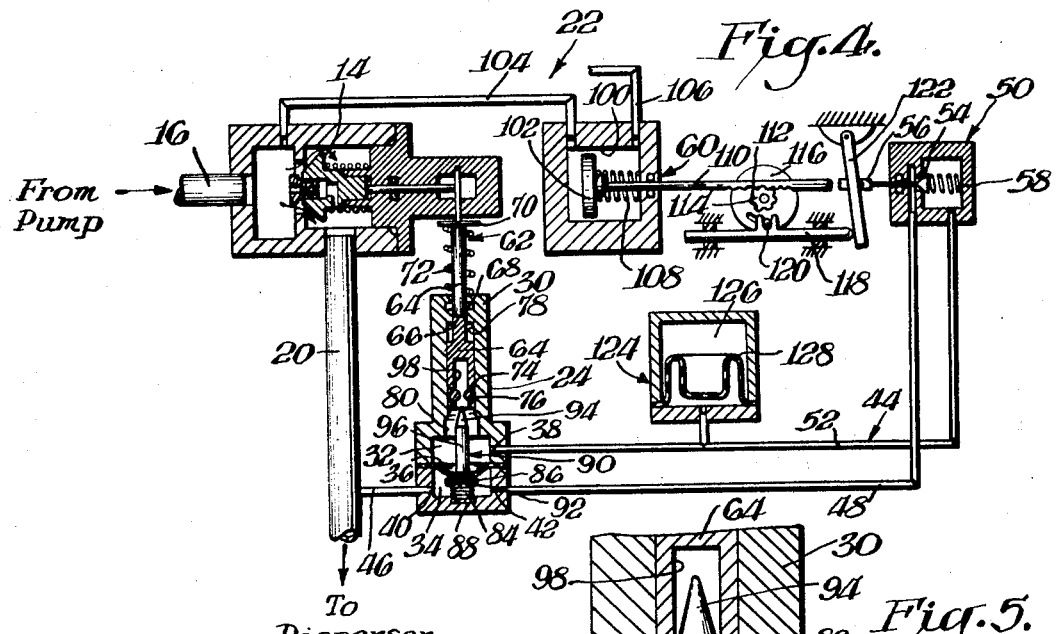
FIGURE 4 is a sectional view similar to FIGURE 2 showing the positions of the various components immediately after the detection of a leak.
Figure 5:
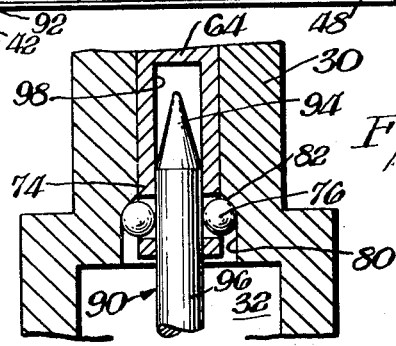
FIGURE 5 is an enlarged sectional view of the pressure differential detector according to the present invention.

The by-pass valve arrangement 50 includes a plug 54 having a valve stem 56 that extends through the valve casing. A coil spring 58 urges the plug to the left, as shown in FIGURES 2–4, or in other words to the closed position of the valve arrangement which position interrupts the communication between the fluid pressure in the second and third lines of the conduit network. The by-pass valve arrangement 50 is controlled by a valve operator 60, as explained more fully below.

The pressure differential detector 24 has an operator 62 connected for movement between an extended leak indicating position, as shown in FIGURE 4, and a depressed locked position, as shown in FIGURES 2 and 3. The operator comprises a plunger 64 which slides in a passageway 66 in the housing 30 of the detector. A sealing ring 68 near the surface of the housing engages the plunger 64. The exposed end of the plunger 64 has a collar 70 fixed thereto and a coil spring 72 reacts between the collar and the surface of the housing to urge the plunger 64 upwardly toward its extended leak indicating position. The opposite end of the plunger is disposed within the interior of the housing and carries a retainer ring portion 74 with a plurality of spherical balls 76 mounted for lateral movement within the ring portion. The retainer ring portion slides in a second passageway 78 axially aligned with the passageway 66 for the plunger. The housing 30 also has a third passageway or recessed portion 80 which is axially aligned with the passageways 66 and 78 but somewhat larger. An inclined surface 82 is provided within the recessed portion 80 for guiding the spherical balls out of that portion, as explained more fully below.

The flexible diaphragm 36 of the pressure differential detector 24 is urged upwardly by a coil spring 84 seated between an inverted cup-shaped member 86 and a recess 88 in the bottom of the lower chamber 34. A lock release element 90 is secured to the flexible diaphragm 36 on the upper side of the diaphragm opposite the cup-shaped member and a fastener 92 extends through the cup-shaped member and the diaphragm into the lock release element to secure these components together. The lock release element includes a conical-shaped portion 94 at the end of a stem 96 that slides within a bore 98 in the plunger 64.

The force of the coil spring 84 is directly related to the pressure differential necessary to remove the diaphragm 36 downwardly. In other words, the force generated by the fluid pressure in the upper chamber must exceed by the value of the coil spring force the force generated by the fluid pressure in the lower chamber. Thus, the force of the coil spring determines the minimum pressure differential that will cause the diaphragm to move downwardly. Moreover, the force of this spring is such that minor pressure fluctuations will not cause the detector to indicate the existence of a leak.

As explained above, the valve operator 60 functions to move the plug 54 of the by-pass valve arrangement 50 between its open and closed positions during the operation of the leak detecting system 22. In this regard, movement of the stem 56 connected to the plug 54 to the right or left, as viewed in FIGURES 2–4, opens and closes the valve, respectively. The valve operator 60 includes a cylinder 100 within which a piston 102 is slidably mounted. One side of the cylinder is connected by a line 104 to the upstream side of the combination check and pressure relief valve 14 of the pumping assembly 10 while the other side of the cylinder is simply vented to the atmosphere through line 106. As explained more fully below, during a dispensing operation fluid pressure is conducted into the cylinder 100 through the line 104 to thereby urge the piston 102 to the right, as viewed in FIGURES 2–4, against the force of a coil spring 108 located within the cylinder.

The piston 102 is connected to a piston rod 110 axially aligned with the stem 56 of the by-pass valve arrangement 50 so that the piston rod hits the stem and opens the valve when the piston 102 moves to the right, as viewed in FIGURES 2–4. The piston rod 110 includes a rack portion 112 that cooperates with the pinion 114 of a timing device 116. The timing device in turn is connected to a sliding bar 118 through a connection 120. As explained more fully below, the timer is cocked when the piston rod is advanced but does not begin its countdown until the rod 110 is withdrawn into the cylinder 100 at the end of a dispensing operation. When the countdown is completed the sliding rod 118 is snapped to its right-hand position illustrated in FIGURE 2 where it engages a linkage 122. The linkage in turn strikes the stem 56 of the by-pass valve arrangement to thereby move the valve to its open position.

As shown in the drawing the third line 52 of the conduit network 44 may be provided with an accumulator 124 comprising an air chamber 126 separated from the liquid in the third line by a rolling diaphragm or bellows 128. Due to the incompressibility of the liquid in the third line and in the upper chamber 32 of the detector 24 the fluid pressure therein will tend to remain more constant, as the volume fluctuates, than if it were completely filled with liquid.

In operation, the system 22 of the present invention functions to detect leaks in the underground fluid supply line 20. Prior to the dispensing operation, the various components comprising the system are positioned as illustrated in FIGURE 2 of the drawing. The by-pass valve arrangement 50 is in its open position thereby providing communication between the second and third lines of the conduit network 44. The pressure differential detector 24 is in its downwardly depressed lock position and can be moved to that position manually.

Turning now to FIGURE 3, the leak detecting system 22 is shown during a dispensing operation and liquid is taken from the tank 12 by operating the pumping unit of the pumping assembly 10. The liquid flows through the combination check and pressure relief valve 14 into the fluid supply line 20 and is transported to the dispenser 18 located at the dispensing station. Fluid flows from the supply line 20 through the conduit network into the upper and lower chambers of the pressure differential detector 24. Under these conditions the fluid pressure in the lower chamber communicates with the fluid pressure in the upper chamber since the by-pass valve 50 is held in its open position by the valve operator 60.

The valve operator 60 holds the valve in its already open position when the dispensing operation is started. At this time the fluid pressure on the upstream side of the combination check and pressure relief valve 14 increases considerably and this fluid pressure being connected to the cylinder 100 through the line 104 operates to urge the piston 102 to the right against the force of the coil spring 108. As the piston moves, the rod 110 moves with it and the rack portion 112 of that rod cooperates with the pinion 114 of the timing device 116 to wind the timer. As the rod 110 transverses from left to right, it engages the valve stem 56 holding the by-pass valve open. As the timer is wound, the pin 120 rotates, retracting the sliding bar 118 until it disengages its link 122 from the valve stem, as shown in FIGURE 3. Through the action of the valve operator 60, the valve remains in its open position until the end of the dispensing operation at which time the fluid pressure at the upstream side of the combination check and pressure relief valve 14 decreases. When the force of the pressure acting on the piston 102 is less than the force of the coil spring 108 the piston moves to the left to allow the by-pass valve to close. An overrunning clutch connection between the timer mechanism and the pinion 114 enables the rod 110 to move to the left without disturbing the timing device. When this occurs the countdown of the timing device 116 commences and at the expiration of this countdown the sliding bar 118 is snapped to the right, as viewed in FIGURE 2, where it engages the linkage 122 which in turn strikes the stem 56 of the by-pass valve to open the valve.

When the by-pass valve is closed after a dispensing operation the system is checked for leaks. By closing the valve the fluid pressure in the upper chamber 32 of the detector 24 is isolated from the fluid pressure in the supply line 20 and the lower chamber 34 of the detector. The isolated fluid in the upper chamber acts as a reference and corresponds to the fluid pressure within the supply line during the dispensing operation. Slight changes in volume of the liquid in the upper chamber of the detector and in the third line 52 of the conduit network 44 are compensated for by the accumulator 124 due to the compressibility of the air in the chamber 126 of the accumulator.

Under tight conditions the fluid pressure in the upper chamber 32 of the detector is substantially the same as the fluid pressure in the lower chamber 34 since each of these pressures is representative of the fluid pressure in the supply line during a dispensing operation. The fluid pressure in the upper chamber acts as the reference pressure and the reference is established by trapping or isolating within the upper chamber of the detector fluid from the supply line at dispensing conditions. In the absence of a pressure differential above a predetermined amount the flexible diaphragm 36 remains as illustrated in FIGURES 2 and 3 with the plunger 64 in its depressed locked position.

On the other hand, when a significant leak occurs in the fluid supply line, the pressure of the fluid in that line decreases relative to the reference pressure trapped in the upper chamber of the detector, which pressure corresponds to the fluid pressure in the supply line during a dispensing operation. This pressure differential acting on the flexible diaphragm 36 causes the diaphragm to move downwardly against the force of the coil spring 84. The greater fluid pressure in the upper chamber 32 causes the diaphragm to move in a downward direction. As the diaphragm so moves, it also carries the lock release element 90. Movement of the conical-shaped portion 94 of the lock release element 90 away from the bore 98 causes the spherical balls 76 within the retainer ring portion 74 to slide radially inwardly along the inclined surface 82 until the balls fit within the passageway 78 in the housing 30 of the detector 24. Once the balls clear the passageway or recessed portion 80 the coil spring 72 snaps the plunger 64 to its extended leak indicating position, as shown in FIGURE 4.

The existence of a leak in the fluid supply line can be indicated by disabling the flow of fluid through the supply line during subsequent dispensing operations. As shown in FIGURE 4, this can be accomplished by providing the plunger 64 of the detector 24 with an extension 130 that prevents the combination check and pressure relief valve 14 from opening fully when the operator 62 is snapped to its extended leak indicating position. After the leak has been located and corrected the system can be reset by manually depressing the operator of the detector to its locked position. The system will then automatically make another test at the end of the next dispensing operation in the same manner described above.

What is claimed is:

1. A method for detecting leaks in a fluid supply line running from a pumping assembly pressure source to a fluid dispensing apparatus comprising the steps of isolating the supply line from the pressure source at pressure conditions prevailing at the termination of a dispensing operation while simultaneously establishing a reference pressure corresponding to the same pressure conditions, comparing the established reference pressure with the fluid pressure in the supply line for a predetermined time after the termniation of the dispensing operation to ascertain the pressure differential therebetween, indicating that a leak exists in the fluid supply line when the pressure differential is more than a predetermined amount, and abolishing the reference pressure after lapse of the predetermined time.

2. A method for detecting leaks as in claim 1 wherein the reference pressure is established by trapping a portion of the fluid from the supply line at dispensing pressure.

3. A method for detecting leaks as in claim 1 wherein the indicating is accomplished by disabling the flow of fluid through the fluid supply line when the pressure differential exceeds a predetermined amount.

4. A method for detecting leaks as in claim 1 including the steps of interrupting the comparison of the established reference pressure with the fluid pressure in the supply line and abolishing the reference pressure when a dispensing operation is desired prior to the expiration of the comparison.

5. A system for detecting leaks in a fluid supply line running from a pumping assembly to a fluid dispensing apparatus comprising pressure differential detecting means constructed and arranged to indicate pressure differentials which exceed a predetermined amount, upper and lower chambers in the pressure differential detecting means, conduit means connecting the upper and lower chambers of the pressure differential detecting means to the fluid supply line, a valve in the conduit means for isolating the fluid pressure in the upper chamber from the fluid pressure in the remainder of the system, whereby a leak in the fluid supply line causes the fluid pressure in that line and the fluid pressure in the lower chamber to decrease relative to the isolated fluid pressure in the upper chamber, and disabling means connected to the pressure differential detecting means for disabling fluid flow through the supply line when the difference in fluid pressure in the upper and lower chambers is more than a predetermined amount thereby indicating a leak exists.

6. A system for detecting leaks in a fluid supply line running from a pumping assembly to a fluid dispensing apparatus comprising pressure differential detecting means constructed and arranged to indicate pressure differentials which exceed a predetermined amount, upper and lower chambers in the pressure differential detecting means, conduit means connecting the upper and lower chambers of the pressure differential detecting means to the fluid supply line, a valve in the conduit means for isolating the fluid pressure in the upper chamber from the fluid pressure in the remainder of the system, whereby a leak in the fluid supply line causes the fluid pressure in that line and the fluid pressure in the lower chamber to decrease relative to the isolated fluid pressure in the upper chamber, the pressure differential detecting means indicating that a leak exists in the fluid supply line when the difference in fluid pressure in the upper and lower chambers is more than a predetermined amount, and wherein the valve includes a valve operating means connected to hold the valve in the conduit means open during a dispensing operation and closing the valve in the conduit means for a predetermined time after the termination of the dispensing operation.

7. A system for detecting leaks as in claim 6 including a self-contained timing means for controlling the predetermined time the valve is closed.

8. A system for detecting leaks in a fluid supply line running from a pumping assembly to a fluid dispensing apparatus comprising pressure differential detecting means constructed and arranged to indicate pressure differentials which exceed a predetermined amount, upper and lower chambers in the pressure differential detecting means, conduit means connecting the upper and lower chambers of the pressure differential detecting means to the fluid supply line, a valve in the conduit means for isolating the fluid pressure in the upper chamber from the fluid pressure in the remainder of the system, whereby a leak in the fluid supply line causes the fluid pressure in that line and the fluid pressure in the lower chamber to decrease relative to the isolated fluid pressure in the upper chamber, the pressure differential detecting means indicating that a leak exists in the fluid supply line when the difference in fluid pressure in the upper and lower chambers is more than a predetermined amount, and wherein the upper and lower chambers of the pressure differential detecting means are separated by a flexible diaphragm, and the pressure differential detecting means includes an operator connected for movement between a depressed locked position and an extended leak indicating position, biasing means for urging the operator towards its extended leak indicating position, and a releasable locking arrangement for holding the operator in its depressed locked position when the difference between the pressures in the upper and lower chambers is less than the predetermined amount, the locking arrangement including a lock release element connected for movement with the flexible diaphragm whereby the diaphragm and the lock release element move downwardly to release the operator from its depressed locked position when the differential between the fluid pressures in the upper and lower chambers is above the predetermined amount due to a leak in the fluid supply line whereby the operator is then urged by the biasing means to its extended leak indicating position.

9. A system for detecting leaks as in claim 8 including a coil spring connected to urge the flexible diaphragm and the lock release element upwardly whereby the force of the fluid pressure in the upper chamber must be greater than the force of the fluid pressure in the lower chamber and the force of the coil spring in order to move the diaphragm downwardly enough to activate the lock release element.

10. A system for detecting leaks in a fluid supply line running from a pumping assembly to a fluid dispensing apparatus comprising pressure differential detecting means constructed and arranged to indicate pressure differentials which exceed a predetermined amount, upper and lower chambers in the pressure differential detecting means, conduit means connecting the upper and lower chambers of the pressure differential detecting means to the fluid supply line, a valve in the conduit means for isolating the fluid pressure in the upper chamber from the fluid pressure in the remainder of the system, whereby a leak in the fluid supply line causes the fluid pressure in that line and the fluid pressure in the lower chamber to decrease relative to the isolated fluid pressure in the upper chamber, the pressure differential detecting means indicating that a leak exists in the fluid supply line when the difference in fluid pressure in the upper and lower chambers is more than a predetermined amount, and a sealed air chamber connected to the conduit means between the valve and the upper chamber of the pressure differential detecting means and a flexible diaphragm separating the air in the chamber from the fluid in the conduit means whereby the fluid pressure in the upper chamber of the pressure differential detecting means remains substantially constant after isolation from the fluid pressure in the remainder of the system.

References Cited

UNITED STATES PATENTS

| | | | |
|---|---|---|---|
| 2,534,158 | 12/1950 | Annin | 73—40 |
| 2,936,611 | 5/1960 | Le Mat et al. | 73—40 XR |
| 2,952,387 | 9/1960 | Fowler et al. | 73—40.5 XR |
| 2,961,868 | 11/1960 | Hooper | 73—40 |
| 3,100,986 | 8/1963 | Starr et al. | 73—40 |
| 3,183,723 | 5/1965 | Deters | 73—40.5 |
| 3,273,753 | 9/1966 | Johnson et al. | 73—40.5 XR |
| 3,360,982 | 1/1968 | Mitchell et al. | 73—40 |

LOUIS R. PRINCE, *Primary Examiner.*

J. NOLTON, *Assistant Examiner.*

U.S. Cl. X.R.

73—40.5